United States Patent
Xi et al.

(10) Patent No.: US 9,856,012 B2
(45) Date of Patent: Jan. 2, 2018

(54) MORPHING WING FOR AN AIRCRAFT

(71) Applicant: BOMBARDIER INC., Dorval (CA)

(72) Inventors: Fengfeng Xi, Toronto (CA); Allan Daniel Finistauri, Brampton (CA); Amin Moosavian, Mississauga (CA)

(73) Assignee: BOMBARDIER INC., Dorval, Quebec (CA)

( * ) Notice: Subject to any disclaimer, the term of this patent is extended or adjusted under 35 U.S.C. 154(b) by 66 days.

(21) Appl. No.: 14/408,722

(22) PCT Filed: Jun. 21, 2013

(86) PCT No.: PCT/US2013/046952
§ 371 (c)(1),
(2) Date: Dec. 17, 2014

(87) PCT Pub. No.: WO2013/192483
PCT Pub. Date: Dec. 27, 2013

(65) Prior Publication Data
US 2015/0151830 A1    Jun. 4, 2015

Related U.S. Application Data

(60) Provisional application No. 61/662,624, filed on Jun. 21, 2012.

(51) Int. Cl.
*B64C 3/38* (2006.01)
*B64C 3/44* (2006.01)
(Continued)

(52) U.S. Cl.
CPC ............... *B64C 3/38* (2013.01); *B64C 3/385* (2013.01); *B64C 3/40* (2013.01); *B64C 3/44* (2013.01);
(Continued)

(58) Field of Classification Search
CPC ....... B64C 3/48; B64C 3/54; B64C 2003/445; B64C 3/38; B64C 3/385; B64C 3/40; B64C 3/44; B54C 3/52; B54C 2003/543
See application file for complete search history.

(56) References Cited

U.S. PATENT DOCUMENTS 827,017 A * 7/1906 Hofmann .................. B64C 3/56
244/49
1,115,073 A * 10/1914 Holle ........................ B64C 3/40
244/46
(Continued)

FOREIGN PATENT DOCUMENTS

CN   101503113 A   8/2009
CN   102066196 A   5/2011
(Continued)

OTHER PUBLICATIONS

Fengfeng Xi, et al., "Development of an Aircraft Morphing Wing Using Variable Geometry Truss Mechanisms", Ryerson University, Jan. 10, 2013.*
(Continued)

*Primary Examiner* — Tien Q Dinh
*Assistant Examiner* — Alexander V. Giczy
(74) *Attorney, Agent, or Firm* — Karceski IP Law, PLLC

(57) ABSTRACT

A morphing wing for an aircraft includes first and second structural ribs with four active members and four passive members connected therebetween. First and second active members and third and fourth active members attach at first and second positions. The first and third active members and the second and fourth active members attach at third and fourth positions. A first passive member connects between third and fifth positions. A second passive member connects between second and seventh positions. A third passive member connects between fourth and sixth positions. A fourth passive member connects between first and eighth (Continued)

positions. Adjustment of the four active members morphs the wing from a first configuration to a second configuration. The first and second positions are at corners of a first quadrilateral diagonally opposite to one another. The four passive members attach to the first structural rib at the corners of the first quadrilateral.

21 Claims, 9 Drawing Sheets

(51) Int. Cl.
 B64C 3/54 (2006.01)
 B64C 3/52 (2006.01)
 B64C 3/40 (2006.01)
(52) U.S. Cl.
 CPC .............. B64C 3/52 (2013.01); B64C 3/54 (2013.01); B64C 2003/445 (2013.01); B64C 2003/543 (2013.01); Y02T 50/145 (2013.01)

(56) References Cited

U.S. PATENT DOCUMENTS

| | | | |
|---|---|---|---|
| 1,653,903 A * | 12/1927 | Hall | B64C 3/54 244/218 |
| 1,841,936 A * | 1/1932 | Bruns | B64C 3/54 244/218 |
| 4,427,169 A | 1/1984 | Brown | |
| 4,432,516 A | 2/1984 | Muscatell | |
| 5,004,189 A | 4/1991 | Igram | |
| 5,114,104 A | 5/1992 | Cincotta et al. | |
| 5,280,863 A * | 1/1994 | Schmittle | B64C 3/385 244/46 |
| 5,433,404 A | 7/1995 | Ashill et al. | |
| 5,531,407 A * | 7/1996 | Austin | B64C 3/48 244/219 |
| 5,662,294 A | 9/1997 | Maclean et al. | |
| 6,070,834 A | 6/2000 | Janker et al. | |
| 6,138,956 A | 10/2000 | Monner | |
| 6,152,405 A | 11/2000 | Muller | |
| 6,164,599 A | 12/2000 | Piening et al. | |
| 6,182,929 B1 | 2/2001 | Martin et al. | |
| 6,276,641 B1 | 8/2001 | Gruenewald et al. | |
| 6,347,769 B1 | 2/2002 | To et al. | |
| 6,491,262 B1 | 12/2002 | Kota | |
| 6,588,709 B1 | 7/2003 | Dunne et al. | |
| 6,622,974 B1 | 9/2003 | Dockter et al. | |
| 6,910,661 B2 | 6/2005 | Dockter et al. | |
| 7,028,948 B2 | 4/2006 | Pitt | |
| 7,108,231 B2 | 9/2006 | Perez-Sanchez | |
| 7,530,533 B2 | 5/2009 | Perez-Sanchez | |
| 7,607,617 B2 | 10/2009 | Law | |
| 7,699,270 B2 | 4/2010 | Lonsinger et al. | |
| 7,798,443 B2 * | 9/2010 | Hamilton | B64C 3/38 244/198 |
| 7,883,060 B2 | 2/2011 | Phillips | |
| 7,901,524 B1 * | 3/2011 | McKnight | B29C 53/02 148/563 |
| 7,909,292 B2 | 3/2011 | Law | |
| 7,918,421 B2 | 4/2011 | Voglsinger et al. | |
| 8,042,772 B2 | 10/2011 | Lutke et al. | |
| 8,056,865 B2 | 11/2011 | Grip | |
| 2002/0100842 A1 | 8/2002 | Perez | |
| 2004/0069907 A1 | 4/2004 | Dockter et al. | |
| 2006/0118675 A1 * | 6/2006 | Tidwell | B64C 3/40 244/123.1 |
| 2006/0145029 A1 | 7/2006 | Lonsinger | |
| 2006/0157623 A1 | 7/2006 | Voglsinger et al. | |
| 2007/0120011 A1 | 5/2007 | Schultz | |
| 2007/0152106 A9 | 7/2007 | Perez-Sanchez | |
| 2008/0035798 A1 * | 2/2008 | Kothera | B63B 1/248 244/212 |
| 2009/0302168 A1 | 12/2009 | Hetrick et al. | |
| 2010/0170995 A1 * | 7/2010 | Maenz | B64C 1/26 244/131 |
| 2010/0224734 A1 | 9/2010 | Grip | |
| 2011/0001018 A1 | 1/2011 | Hamilton et al. | |
| 2011/0017876 A1 | 1/2011 | Manley et al. | |
| 2011/0038727 A1 | 2/2011 | Vos et al. | |
| 2011/0101172 A1 * | 5/2011 | Dyckrup | B64C 7/00 244/201 |
| 2011/0114791 A1 * | 5/2011 | Henry | B29C 70/088 244/123.6 |
| 2015/0167288 A1 * | 6/2015 | Harkin | E01D 6/00 403/107 |

FOREIGN PATENT DOCUMENTS

| | | |
|---|---|---|
| DE | 19709917 C1 | 4/1998 |
| DE | 102004045651 A1 | 3/2006 |
| DE | 102006032453 A1 | 1/2007 |
| FR | 2927377 A1 | 8/2009 |
| FR | 2927607 A1 | 8/2009 |
| RU | 2299833 C1 | 5/2007 |
| WO | WO 2011059571 A1 | 5/2011 |
| WO | 2011089277 A1 | 7/2011 |

OTHER PUBLICATIONS

Julie Blondeau Samuel et al., "Design and Testing of a Pneumatic Telescopic Wing for Unmanned Aerial Vehicles", Journal of Aircraft, vol. 44, No. 4, pp. 1088-1099, Jul.-Aug. 2007.*
Wikipedia, "Linear-motion bearing", https://en.wikipedia.org/wiki/Linear-motion_bearing. Archived on Jul. 30, 2010 by the Internet Archive, https://web.archive.org/web/20100730163757/http://en.wikipedia.org/wiki/Linear-motion_bearing; accessed May 14, 2016.*
Bubert, E.A., Woods, B.K.S., Lee, K., Kothera, C.S. and Wereley, N.M. 2010. "Design and Fabrication of a Passive 1D Morphing Aircraft Skin," Journal of Intelligent Material Systems and Structures, 21:1699-1717.*
Barbarino, Silvestro, et al. "A review of morphing aircraft." Journal of Intelligent Material Systems and Structures 22.9 (2011): 823-877.*
Xi, F., Li, Y. & Wang, H., "Module-based method for design and analysis of reconfigurable parallel robots", Front. Mech. Eng. (2011) 6: 151. doi:10.1007/s11465-011-0121-6 (first online Jun. 4, 2011; accessible from http://link.springer.com/article/10.1007/s11465-011-0121-6, accessed Nov. 18, 2016).*
Finistauri, Allan Daniel, and Fengfeng Xi. "Type synthesis and kinematics of a modular variable geometry truss mechanism for aircraft wing morphing." Reconfigurable Mechanisms and Robots, 2009. ReMAR 2009. ASME/IFToMM International Conference on. IEEE, 2009. Acc. from http://ieeexplore.ieee.org/stamp/stamp.jsp?arnumber=5173872, accessed Nov. 21, 2016.*
Inoue, Fumihiro. Development of adaptive construction structure by variable geometry truss. INTECH Open Access Publisher, 2008; accessible from http://cdn.intechweb.org/pdfs/5570.pdf, accessed Nov. 18, 2016.*
Morley, Joshua. Shape Optimization and Modular Discretization for the Development of a Morphing Wingtip. Diss. University of Toronto, 2012; accessible from https://tspace.library.utoronto.ca/handle/1807/33455, accessed Nov. 18, 2016.*
Finistauri, Allan et al., "Wing Line Discretization for the Development of a MOdular Morphing Wing,", 52nd AIAA/ASME/ASCE/AHS/ASC Structures, Structural Dynamics and Materials Conference, Apr. 4-7, 2011, Denver, CO; AIAA 2011-1884 (accessible from http://enu.kz/repository/2011/AIAA-2011-1884.pdf, accessed Nov. 18, 2016).*
Armando R. Rodriguez, "Morphing Aircraft Technology Survey", AIAA 2007-1258, 45th AIAA Aerospace Sciences Meeting adn Exhibit, Jan. 8-11, 2007, Reno NV; accessible from https://arc.aiaa.org/doi/pdf/10.2514/6.2007-1258; accessed Apr. 28, 2017.*
Jae-Sung Bae et al., "Aerodynamic and Aeroelastic Considerations of a Variables-Span Morphing Wing", American Institute of Aeronautics and Astronautics, AIAA 2004-1726, pp. 1-9, Apr. 2004.

(56) References Cited

OTHER PUBLICATIONS

Jae-Sung Bae et al., "Aerodynamic and Static Aeroelastic Characteristics of a Variable-Span Morphing Wing", Journal of Aircraft, vol. 42, No. 2, pp. 528-534, Mar.-Apr. 2005.
Gerald Andersen et al., "Aeroelastic Modeling, Analysis and Testing of a Morphing Wing Structure", American Institutes of Aeronautics and Astronautics, AIAA 2007-1734, pp. 1-15, Apr. 2007.
Deepak S. Ramrakhyani et al., "Aircraft Structural Morphing Using Tendon-Actuated Compliant Cellular Trusses", Journal of Aircraft 42(6), pp. 1615-1621, Nov.-Dec. 2005.
Daisaku Inoyama et al., "Computational Design of Morphing Wing Structures through Multiple-Stage Optimization Process", American Institute of Aeronautics and Astronautics, AIAA 2007-1712, pp. 1-10, Apr. 2007.
Mujahid Abdulrahim et al., "Control and Simulation of Multi-Role Morphing Micro Air Vehicle", Proceeding of AIAA Guidance, Navigation, and Control Conference and Exhibit, AIAA 2005-6481, pp. 1-19, Aug. 2005.
M. H. Love et al., "Demonstration of Morphing Technology through Ground and Wind Tunnel Tests", Proceedings of 15th AIAA/ASME/AHS Adaptive Structures Conference, AIAA 2007-1729, pp. 1-12, Apr. 2007.
Luis Falcao et al., "Design and Analysis of an Adaptive Wingtip", American Institute of Aeronautics and Astronautics, AIAA 2011-2131, pp. 1-13, Apr. 2011.
Yudi Heryawan et al., "Design and Demonstration of a Small Expandable Morphing Wing", Smart Structures Materials, vol. 5764, pp. 224-231, Jan. 2005.
Bret Stanford et al., "Design and Optimization of Morphing Mechanisms for Highly Flexible Micro Air Vehicles", American Institute of Aeronautics and Astronautics, AIAA 2006-2162, pp. 1-13, May 2006.
Jayanth Kudva et al., "Design, Fabrication, and Testing of the DARPA/Wright Lab 'Smart Wing' Wind Tunnel Model", AIAA, Jan. 1997.
Derek R. Bye et al., "Design of a Morphing Vehicle", Proceedings of 15th AIAA/ASME/AHS Adaptive Structures Conference, Honolulu, Hawaii, Apr. 2007.
Manoranjan Majji et al., "Design of a Morphing Wing: Modeling and Experiments", AIAA Atmospheric Flight Mechanics Conference and Exhibit, AIAA 2007-6310, pp. 1-9, Aug. 2007.
J. Mestrinho et al., "Design Optimization of a Variable-Span Morphing Wing for a Small UAV", 52nd AIAA/ASME/ASCE/AHS/ASC Structures, Structural Dynamics and Materials Conference, AIAA 2011-2026, pp. 1-18, Apr. 2011.
Julie Blondeau et al., "Design, Development and Testing of a Morphing Aspect Ration Wing Using and Inflatable Telescopic Spar", American Institute of Aeronautics and Astronautics, 44th AIAA/ASME/ASCE/AHS Structures, Structural Dynamic and Materials Conference, AIAA 2003-1718, pp. 1-11, Apr. 2003.
John S, Flanagan et al., "Development and Flight Testing of a Morphing Aircraft the NextGen MFX-1", American Institute of Aeronautics and Astronautics, AIAA 2007-1707, pp. 1-3, Apr. 2007.
David A. Neal III et al., "Development of a Morphing Aircraft Model for Wind Tunnel Experimentation", American Institute of Aeronautics and Astronautics, AIAA 2006-2141, pp. 1-14, May 2006.
A. Leite et al., "Development of Morphing Strategies for Flight Demonstrator RPV", American Institute of Aeronautics and Astronautics, AIAA 2009-2134, pp. 1-15, May 2009.
Daniel T. Grant et al., "Effects of Time-Varying Inertias on Flight Dynamics of an Asymmetric Variable-Sweep Morphing Aircraft", American Institute of Aeronautics and Astronautics, AIAA 2007-6487, pp. 1-15, Aug. 2007.
YoonSik Shim et al., "Feathered Flyer: Integrating Morphological Computation and Sensory Reflexes into a Physically Simulated Flapping-Wing Robot for Robust Flight Manoeuvre", ECAL, pp. 756-765, Jan. 2007.
Mujahid Abdulrahim et al., "Flight Characteristics of Shaping the Membrane Wing of a Micro Air Vehicle", Journal of Aircraft, vol. 42, No. 1, pp. 131-137, Jan.-Feb. 2005.
Mujahid Abdulrahim, "Flight Performance Characteristics of a Biologically-Inspired Morphing Aircraft", 43rd AIAA Aerospace Sciences Meeting and Exhibit, AIAA 2005-345, pp. 1-15, Jan. 2005.
Mujahid Abdulrahim et al., "Flight Testing a Micro Air Vehicle Using Morphing for Aeroservoelastic Control", 45th AIAA/ASME/ASCE/AHSA/ASC Structures, Structural Dynamics & Materials Conference, AIAA 2004-1674, pp. 1-17, Apr. 2004.
Mujahid Abdulrahim et al., "Flight Testing and Response Characteristics of a Variable Gull-Wing Morphing Aircraft", Proceedings of AIAA Guidance, Navigation, and Control Conference and Exhibit, AIAA 2004-5115, pp. 1-16, Aug. 2004.
Neha Gandhi et al., "Intelligent Control of a Morphing Aircraft", American Institute of Aeronautics and Astronautics, Structures, Structural Dynamics & Materials Conference, AIAA 2007-1716, pp. 1-17, Apr. 2007.
Matt Detrick et al., "Modeling and Design of a Morphing Wing for Micro Unmanned Aerial Vehicles via Active Twist", American Institute of Aeronautics and Astronautics, Structures, Structural Dynamics & Materials Conference, AIAA 2007-1788, pp. 1-7, Apr. 2007.
N. Ameri et al., "Modelling Continuously Morphing Aircraft Flight Control", American Institute of Aeronautics and Astronautics, Guidance, Navigation and Control Conference and Exhibit, AIAA 2008-6966, pp. 1-23, Aug. 2008.
Brian C. Prock et al., "Morphing Airfoil Shape Change Optimization with Minumum Actuator Energy as an Objective", American Institute of Aeronautics and Astronautics, Symposium on Multidisciplinary Analysis and Optimization, AIAA 2002-5401, pp. 1-13, Sep. 2002.
David Cadogan et al., "Morphing Inflatable Wing Development for Compact Package Unmanned Aerial Vehicles", 45th AIAA/ASME/ASCE/AHS/ASC Structures, Structural Dynamics & Materials Conference, AIAA 2004-1807, pp. 1-13, Apr. 2004.
Jouannet, C. et al., "Morphing Wing Design Study to Flight Test", American Institute of Aeronautics and Astronautics, Aerospace Sciences Meeting including the New Horizons Forum and Aerospace Exposition, AIAA 2009-1619, pp. 1-12, Jan. 2009.
Onur Bilgen et al., "Morphing Wing Micro-Air-Vehicles via Macro-Fiber Composite Actuators", American Institute of Aeronautics and Astronautics, Structures, Structural Dynamic and Materials Conferences, AIAA 2007-1785, pp. 1-16, Apr. 2007.
David A. Perkins et al., "Morphing Wing Structures for Loitering Air Vehicles", American Institute of Aeronautics and Astronautics, Structures, Structural Dynamic and Materials Conferences, AIAA 2004-1888, pp. 1-10, Apr. 2004.
Livier Gonzalez, "Morphing Wing Using Shape Memory Alloy: A Concept Proposal", University of Puerto Rico et Mayaguez, pp. 1-6, Jan. 2005.
Michael D. Skillen et al., "Morphing Wing Weight Predictors and Their Application in a Template-Based Morphing Aircraft Sizing Environment II; Part II: Morphing Aircraft Sizing Via Multi-Level Optimization", School of Aeronautics and Astronautics, NASA/CR-2008-214903, pp. 1-22, Feb. 2008.
Pascal de Marmier et al., "Morphing Wings of a Small Scale UAV Using Inflatable Actuators for Sweep Control", American Institute of Aeronautics and Astronautics, Structures, Structural Dynamic and Materials Conferences, AIAA 2008-1802, pp. 1-11, Apr. 2003.
D.D.Smith et al., "Multi-Objective Optimization for the Multiphase Design of Active Polymorphing Wings", Journal of Aircraft, vol. 49, No. 4, pp. 1153-1160, Jul.-Aug. 2012.
James J. Joo et al., "Optimal Actuator Location Within a Morphing Wing Scissor Mechanism Configuration", Smart Structures and Materials 2006: Modeling, Signal Processing and Control, Proc. of SPIE vol. 6166, 616603, pp. 1-12, Jan. 2006.
J. Vale et al., "Optimization of a Morphing Wing Based on Coupled Aerodynamic and Structural Constraints", American Institute of Aeronautics and Astronautics, Structures, Structural Dynamic and Materials Conferences, pp. 1-27, Apr. 2007.

(56) References Cited

OTHER PUBLICATIONS

Keith W. Moored et al., "Optimization of a Tensegrity Wing for Biomimetic Applications", Proceedings of 45th IEEE Conference on Decision & Control, pp. 2288-2293, Dec. 2006.

P. Bourdin et al., "Potential of Articulated Split Wingtips for Morphing-Based Control of a Flying Wing", American Institute of Aeronautics and Astronautics, Applied Aerodynamics Conference, AIAA 2007-4443, pp. 1-16, Jun. 2007.

Helen M. Garcia et al., "Roll Control for a Micro Air Vehicle Using Active Wing Morphing", American Institute of Aeronautics and Astronautics; Guidance, Navigation, and Control Conference and Exhibit, AIAA 2003-5347, pp. 1-10, Aug. 2003.

A. Y. N. Sofia et al., "Shape Morphing of Aircraft Wing: Status and Challenges", Materials and Design 31, pp. 1284-1292, Jan. 2010.

Onur Bilgen et al., "Surface Actuated Variable-Camber and Variable-Twist Morphing Wings Using Piezocomposites", American Institute of Aeronautics and Astronautics, Structures, Structural Dynamic and Materials Conferences, AIAA 2011-2072, pp. 1-13, Apr. 2011.

Smita Bharti et al., "Tendon Actuated Cellular Mechanisms for Morphing Aircraft Wing", Proc. of SPIE, vol. 6523, pp. 652307-1/652307-13, Jan. 2007.

P. Bourdin et al., "The Application of Variable Cant Angle Winglets for Morphing Aircraft Control", American Institute of Aeronautics and Astronautics, Applied Aerodynamics Conference, AIAA 2006-3660, pp. 1-13, Jun. 2006.

Daisaku Inoyama et al., "Topology Synthesis of Distributed Actuation Systems for Morphing Wing Structures", Journal of Aircraft, vol. 44, No. 4, pp. 1205-1213, Jul.-Aug. 2007.

Mujahid Abdulrahim et al., "Using Avian Morphology to Enhance Aircraft Maneuverability", American Institute of Aeronautics and Astronautics, Atmospheric Flight Mechanics Conference and Exhibit, AIAA 2006-6643, pp. 1-17, Aug. 2006.

Thomas G. Ivanco et al., "Validation of the Lockheed Martin Morphing Concept with Wind Tunnel Testing", American Institute of Aeronautics and Astronautics, Structures Structural Dynamics and Materials Conference, AIAA 2007-2235, pp. 1-17, Apr. 2007.

Richard Guiler et al., "Wind Tunnel Analysis of a Morphing Swept Wing Tailless Aircraft", American Institute of Aeronautics and Astronautics, Applied Aerodynamics Conference, AIAA 2005-4981, pp. 1-14, Jun. 2005.

Jennifer M. Lukens et al., "Wing Mechanization Design and Analysis for a Perching Micro Air Vehicle", American Institute of Aeronautics and Astronautics, Structures Structural Dynamics and Materials Conference, AIAA 2008-1794, pp. 1-10, Apr. 2008.

Chinese Office Action dated Aug. 31, 2015, for Chinese Patent Application No. 201380033022.1.

International Search Report and Written Opinion dated Nov. 5, 2013, for International Patent Application No. PCT/US2013/046952.

Chinese Office Action dated May 16, 2016, for Chinese Patent Application No. 201380033022.1.

\* cited by examiner

MORPHING WING FOR AN AIRCRAFT

CROSS-REFERENCE TO RELATED APPLICATION(S)

This is a National Stage Entry into the United States Patent and Trademark Office from International Patent Application No. PCT/US2013/046952, having an international filing date of Jun. 21, 2013, which relies for priority on U.S. Provisional Patent Application Ser. No. 61/662,624, filed on Jun. 21, 2012, the entire contents of both of which are incorporated herein by reference.

FIELD OF THE INVENTION

The present invention concerns the construction and operation of the wing of an aircraft. More specifically, the present invention concerns an aircraft wing where the shape of the wing may be altered during flight to alter the flight characteristics of the aircraft.

DESCRIPTION OF THE RELATED ART

The prior art include several examples of aircraft wings that address a number of different concerns with respect thereto.

It is noted that the prior art includes a number of examples where the wings of an aircraft may be modified along the longitudinal axis of the aircraft to alter the lift properties associated therewith.

For example, U.S. Patent Application Publication No. 2011/0001018 (hereinafter "the '018 application") describes a composite material for a geometric morphing wing. FIGS. 4 and 5A-5D illustrate various wing morphologies that are contemplated by the apparatus described in the '018 application.

U.S. Pat. No. 7,909,292 (hereinafter "the '292 patent") describes a wing unit, specifically a spar box, that forms aerodynamically active surfaces. The shape of the wing surface is alterable, according to one aspect of the '292 patent. (The '292 patent at col. 3, lines 7-16.)

U.S. Pat. No. 7,108,231 (hereinafter "the '231 patent") describes an adjustment mechanism, for a variable wing shape. Multiple whirl chambers WK are provided to alter the shape of a portion of the wing. (See, e.g., the '231 patent at col. 8, lines 32-46.)

In another example, U.S. Patent Application Publication No. 2011/0038727 (hereinafter "the '727 application") describes a method and apparatus that provides a wing for an aircraft that morphs in a longitudinal direction. The '727 application describes adaptive technology that may be relied upon to alter the shape of the wing. Specifically, the '727 application describes a honeycomb material where the stiffness of the material may be changed based on cell differential pressure. (The '727 application at paragraph [0086].) In one embodiment, ambient pressure alters the stiffness of the honeycomb material. (The '727 application at paragraph [0087].) In another embodiment, the aircraft's bleed air may be used to control the cell differential pressure and, therefore, the stiffness of the honeycomb material. (The '727 application at paragraph [0088].)

U.S. Patent Application Publication No. 2011/0017876 (hereinafter "the '876 application") describes a method and apparatus for controlling the longitudinal shape of an aircraft's control surface, such as an aileron, elevator, rotor, trim, rudder, spoiler, and the like. (The '876 application at paragraph [0006].) The control surface is made from a flexible skin 428 that is supported on ribs 410, 412. (The '876 application at paragraph [0073].) An assembly, made from many linkages 438-452, connects to the flexible skin 428. (The '876 application at paragraph [0075].) Actuators 478, 479 cooperate with connecting members 453, 457 to alter the shape of the flexible skin 428. (The '876 application at paragraphs [0079].)

U.S. Patent Application Publication No. 2009/0302168 (hereinafter "the '168 application") describes a compliant structure that permits morphing of the leading edge of an airfoil, such as a rotor blade. (The '168 application at paragraph [0079].)

U.S. Patent Application Publication No. 2007/0120011 (hereinafter "the '011 application") describes airfoils made from metastable materials for whose shapes may be changed when subjected to certain conditions. (The '011 application at paragraph [0006].) Piezoelectric materials, shape memory alloys, magnetorestrictive materials, ferroelectric materials, shape memory polymers, or electroactive polymers are some of the possible materials that may be employed. (The '011 application at paragraph [0018].)

U.S. Patent Application Publication No. 2006/0157623 (hereinafter "the '623 application") also describes an airfoil with a shape that is deformable in the longitudinal direction.

U.S. Patent Application Publication No. 2006/0145029 (hereinafter "the '029 application") describes a wing with an adaptable profile. Specifically, the '029 application describes a wing with a flexible region 15 having a profile changeable in both a wing chord direction 5 (i.e., the air flow direction) and the wingspan direction 10 (i.e., the cross flow direction, perpendicular to the wing chord direction). (The '029 application at paragraph [0017]-[0018].) The flexible region 15 includes a number of actuators 60 that act on torsion boxes 53 to change the shape of the wing. (The '029 application at paragraphs [0021]-[0022].)

U.S. Patent Application Publication No. 2002/0100842 (hereinafter "the '842 application") describes a mechanism for regionally adjusting the curvature of an airfoil. The mechanism permits adjustment of a leading edge region 11 and a trailing edge region 12. (The '842 application at paragraph [0025].) The mechanism also permits the curvature of the entire wing 1 to be changed. (The '842 application at paragraph [0025].)

U.S. Pat. No. 7,883,060 (hereinafter "the '060 patent") describes an apparatus and method for twisting a wing to increase lift on an aircraft. Specifically, the '060 patent discusses the twisting of a wing as shown, for example, in FIGS. 17 and 18. (The '060 patent at col. 21, lines 33-36.)

U.S. Pat. No. 7,607,617 (hereinafter "the '617 patent") describes a spar box for an aerodynamically active surface, such as an airfoil, horizontal tail unit, or rudder of an airplane. The spar box permits alteration of the surface shape between upper and lower surfaces of the aerodynamically active surface.

As should be apparent from the foregoing discussion, a good bit of attention has been focused on changing the longitudinal shape of an aircraft's wings to take advantage of different shapes under different flight conditions.

Few inventions, however, appear to focus on wing morphology in the lateral direction (e.g., along the span of the wing).

SUMMARY OF THE INVENTION

The present invention addresses one or more deficiencies associated with wings known in the prior art.

The present invention provides, among other things, a wing for an aircraft where the shape of the wing may be altered along its lateral axis (e.g., along the span of the wing).

In one embodiment, the present invention provides a morphing wing for an aircraft. The morphing wing includes a top surface, a bottom surface, a leading edge, a trailing edge, a tip, and a root. The root is adapted for connection to the aircraft. A longitudinal axis is defined from the leading edge to the trailing edge, and a lateral axis is defined from the tip to the root. A plurality of structural ribs is disposed between the root and tip. The structural ribs extend between the top surface and the bottom surface and intersect with the lateral axis. At least one active member connects between two adjacent structural ribs at a first angle to the lateral axis. At least one active member is actively adjustable. At least one passive member connects between the two adjacent structural ribs at a second angle to the lateral axis. At least one passive member is passively adjustable. Adjustment of the at least one active member moves the adjacent structural ribs with respect to one another, altering at least one of the lateral axis or the longitudinal axis from a first shape to a second shape, thereby morphing the wing from a first configuration to a second configuration.

In another aspect of the present invention, the adjustment of the at least one active member moves the adjacent structural ribs, altering the lateral axis. It is also contemplated that the adjustment of the at least one active member moves the adjacent structural ribs, altering the longitudinal axis. Also, it is contemplated that the adjustment of the at least one active member moves the adjacent structural ribs, altering both the lateral axis and the longitudinal axis.

The present invention also provides a morphing wing for an aircraft where morphing of the wing from the first configuration to the second configuration includes a dihedral alteration of the wing, a sweep alteration of the wing, a twist alteration of the wing, and/or a span alteration of the wing.

In one contemplated embodiment of the present invention, the at least one active member includes a plurality of active members. Further, it is contemplated that the plurality of active members may include four active members.

The present invention also contemplates that the at least one passive member includes a plurality of passive members. The plurality of passive members may include four passive members.

In one contemplated embodiment of the present invention, the morphing wing includes at least one active member that is lockable in a rigid state when deactivated. In this embodiment, the active member may be a linear actuator. If a linear actuator is employed, it is contemplated that the linear actuator may be electromechanically operated, hydraulically operated, pneumatically operated, or operated via a shape memory alloy ("SMA"). Similarly, the active member may be locked electromechanically, hydraulically, pneumatically, and/or via a SMA.

For the morphing wing of the present invention, it is also contemplated that the at least one passive member is lockable in a rigid state when deactivated. The passive member may be operated and locked electromechanically, hydraulically, pneumatically, and/or via a SMA.

In an embodiment of the present invention, the at least one passive member may be a linear bearing. If a linear bearing is employed, the linear bearing may include a self-circulating valve.

It is also contemplated that the morphing wing may be constructed so that the at least one active member includes four active members and the at least one passive member includes four passive members. In this contemplated embodiment, the first angle to the lateral axis lies between about 0 and ±90° and the second angle to the lateral axis lies between about 0 and ±90°. It is also contemplated that the second angle to the lateral axis may be about 0°.

In one contemplated embodiment, the four passive members attach to adjacent ones of the plurality of structural ribs such that the four passive members establish patterns consistent with corners of a rectangle on each of the adjacent structural ribs.

In another contemplated embodiment, the four active members attach to a first one of the structural ribs such that two of the active members each attach to the first structural rib at corners of the rectangle diagonally opposite to one another.

In still another contemplated embodiment, the four active members attach to a second one of the structural ribs such that two of the active members each attach to the second structural rib at corners of the rectangle diagonally opposite to one another and also opposite to the corners of the rectangle on the first structural rib.

The morphing wing of the present invention also may include a skin covering the morphing wing. The skin may be made from metallic materials, composite materials, and/or materials including SMAs. The skin is contemplated to be flexible in one embodiment. In another embodiment, the skin may include a plurality of overlapping sections. Where overlapping sections are employed, the overlapping sections may be disposed in a fish scale fashion with respect to one another. Alternatively, the overlapping sections may be disposed in a louvered fashion with respect to one another. The skin covering may be active or passive in different contemplated embodiments of the present invention. A skin made from a metallic alloy, for example, with no large displacement dependency on temperature activation or electrical activation qualifies as an active skin covering. A skin made from a SMA, capable of changing its shape via temperature activation or electrical activation qualifies as a passive skin covering.

The present invention also provides a module for a morphing wing for an aircraft. The module includes two structural ribs disposed adjacent to one another. The structural ribs define a lateral axis and a longitudinal axis. At least one active member connected between two adjacent structural ribs at a first angle to the lateral axis. The at least one active member is actively adjustable. The module also includes at least one passive member connected between the two adjacent structural ribs at a second angle to the lateral axis. The at least one passive member is passively adjustable. Adjustment of the at least one active member moves the structural ribs with respect to one another, altering at least one of the lateral axis or the longitudinal axis from a first configuration to a second configuration.

With respect to the module of the present invention, it is contemplated that adjustment of the at least one active member moves the adjacent structural ribs, altering the lateral axis. Alternatively, it is also contemplated that adjustment of the at least one active member moves the adjacent structural ribs, altering the longitudinal axis. In a further alternative, it is contemplated that adjustment of the at least one active member moves the adjacent structural ribs, altering the lateral axis and longitudinal axis.

With respect to the module, it is contemplated that the at least one active member includes a plurality of active members. The plurality of active members may include four active members.

With respect to the module, it is contemplated that the at least one passive member includes a plurality of passive members. The plurality of passive members may include four passive members.

In connection with the module, one aspect of the present invention contemplates that the at least one active member is lockable in a rigid state when deactivated. If so, it is contemplated that the at least one active member may be a linear actuator. If a linear actuator is employed, the linear actuator may be electromechanically operated, hydraulically operated, pneumatically operated, and/or operated via a shape memory alloy ("SMA"). Similarly, the active member may be locked electromechanically, hydraulically, pneumatically, and/or via a SMA.

For the module of the present invention, it is contemplated that the at least one passive member is lockable in a rigid state when deactivated. The passive member may be operated and locked electromechanically, hydraulically, pneumatically, and/or via a SMA.

The at least one passive member may be a linear bearing. If so, the linear bearing may include a self-circulating valve.

It is also contemplated that the module may be constructed so that the at least one active member includes four active members and the at least one passive member includes four passive members. In this contemplated embodiment, the first angle to the lateral axis lies between about 0 and ±90° and the second angle to the lateral axis lies between about 0 and ±90°. It is also contemplated that the second angle to the lateral axis may be about 0°.

In one contemplated embodiment of the module, the four passive members attach to adjacent ones of the plurality of structural ribs such that the four passive members establish patterns consistent with corners of a rectangle on each of the adjacent structural ribs.

In another contemplated embodiment of the module, the four active members attach to a first one of the structural ribs such that two of the active members each attach to the first structural rib at corners of the rectangle diagonally opposite to one another.

In still another contemplated embodiment of the module, the four active members attach to a second one of the structural ribs such that two of the active members each attach to the second structural rib at corners of the rectangle diagonally opposite to one another and also opposite to the corners of the rectangle on the first structural rib.

The present invention also encompasses a morphing wing where the active member is connected to the adjacent structural ribs via a fastener, mechanical joint, bearing, ball joint, or load-bearing mechanical structure.

It is contemplated that the structural ribs may include structural members welded thereto, establishing points of connection to the active member.

It is also contemplated that the structural ribs may include structural members integrally formed thereon, establishing points of connection to the active member.

Still further features of the present invention should be appreciated from the drawings appended hereto and from the discussion herein.

BRIEF DESCRIPTION OF THE DRAWINGS

The present invention will now be described in connection with the drawings appended hereto, in which.

DETAILED DESCRIPTION OF EMBODIMENT(S) OF THE INVENTION

Figure 1:
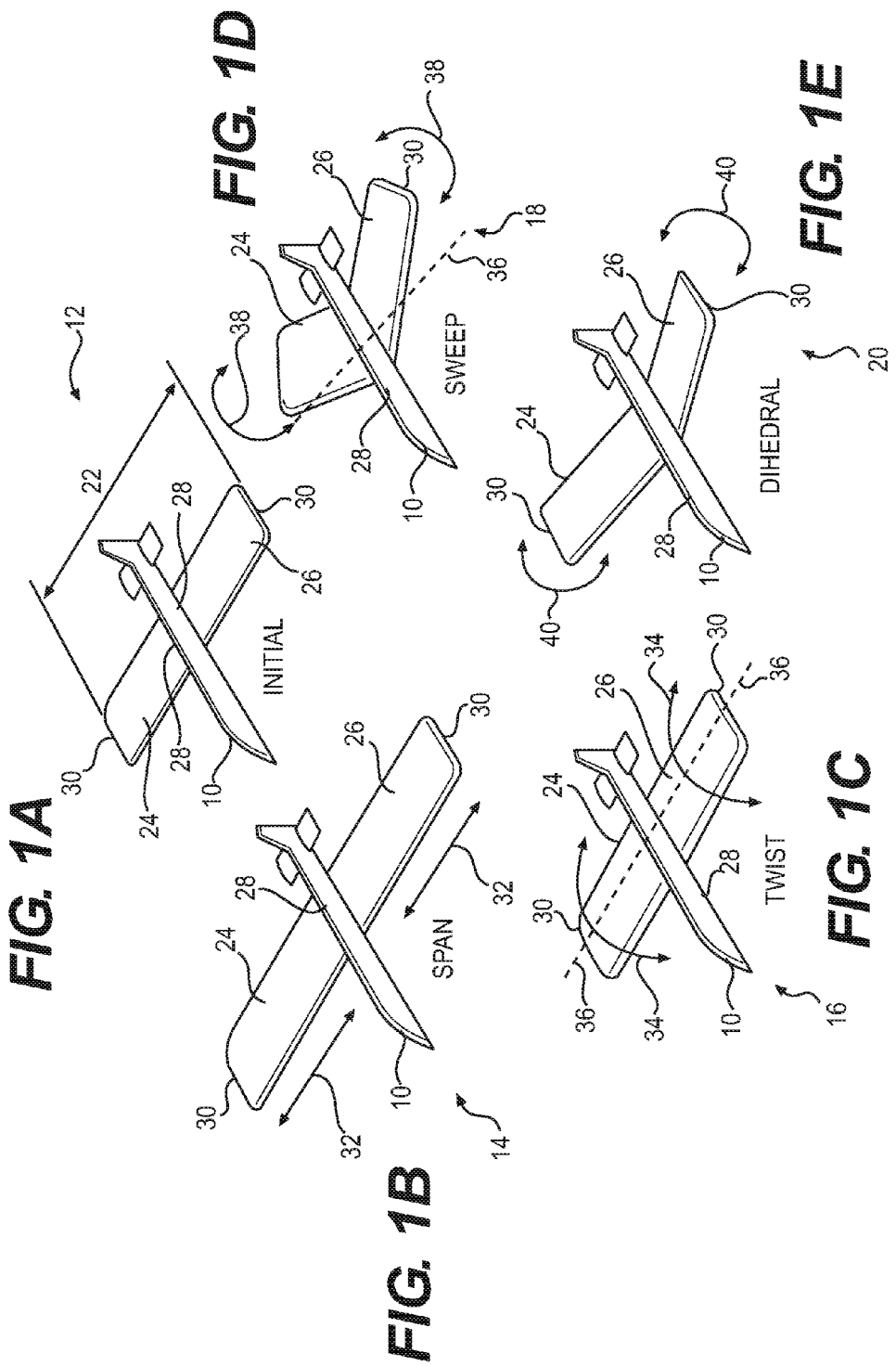
FIG. 1A is a graphical illustration of an initial wing orientation, facilitating comparison with the wing configurations illustrated in FIGS. 1B-1E.
FIG. 1B is a graphical illustration of a span type of motion addressed by the present invention.
FIG. 1C is a graphical illustration of a twist type of motion addressed by the present invention.
FIG. 1D is a graphical illustration of a sweep type of motion addressed by the present invention.
FIG. 1E is a graphical illustration of a dihedral type of motion addressed by the present invention.

The present invention will now be described in connection with one or more embodiments. Discussion of any one particular embodiment is intended to be illustrative of the breadth and scope of the invention. In other words, while attention is focused on specific embodiments, those embodiments are not intended to be limiting of the scope of the present invention. To the contrary, after appreciating the discussion and drawings presented herein, those skilled in the art will readily appreciate one or more variations and equivalents of the embodiments described and illustrated. Those variations and equivalents are intended to be encompassed by the present invention as though they were described herein.

As a point of convention, as should be understood by those skilled in the art, an aircraft includes a front end and a rear end that define a longitudinal axis. The wings, which extend outwardly from the fuselage of the aircraft, define a lateral axis. In the discussion that follows, therefore, reference to a longitudinal axis is intended to refer to an axis parallel to the longitudinal axis of the aircraft. Similarly, reference to a lateral axis is intended to refer to an axis that is parallel to the lateral axis of the aircraft.

As another point of convention, the terms "front," "rear," "up," "down," "right," "left," "starboard," and "port" are intended to refer to directions that are consistent with the direction of travel of a conventional aircraft. The use of these conventions, however, is not intended to be limiting of the present invention. To the contrary, these terms are used merely to facilitate discussion of the considerable breadth and scope of the present invention.

Throughout the discussion that follows, the present invention will be discussed in connection with the wings of an aircraft. While the discussion of the present invention focuses on the wings of an aircraft, the present invention should not be considered as being limited to a "wing." To the contrary, the present invention may be applied to any surface that provides control over the aerodynamic properties of an aircraft, such as the horizontal stabilizer, the vertical stabilizer, the rudder, the engine pylon, or the winglet. Similarly, while the present invention is described in connection with aircraft, the present invention may be applied to other vehicle types including, but not limited to, submersible vehicles, such as submarines.

Additionally, the present invention is described in connection with its application to commercial aircraft, which include passenger aircraft and private or business jets. While the present invention is described in this context, it should be noted that the present invention should not be understood to be limited to just commercial embodiments. To the contrary, the present invention is anticipated to be applicable to any type of aircraft.

Among other variables considered when designing an aircraft, aerospace engineers are challenged to create aircraft that have better fuel efficiency than their predecessors in the prior art. There are a few reasons for this. First, if an aircraft uses less fuel, its operational costs may be reduced. Second, greater fuel efficiency may permit the aircraft to fly longer distances, because it uses less fuel per nautical mile traveled. Third, greater fuel efficiency generates lower pollution.

To achieve greater fuel efficiency, aerospace engineers focus on variables including the efficiency of the aircraft's engines, the weight of the aircraft, and the aerodynamic properties of the airframe. As should be apparent, if the engines themselves are more fuel efficient, the aircraft will be more efficient. If the aircraft is lighter in weight, then the aircraft should be able to achieve greater fuel efficiency simply because there is less weight for the engines to push. Finally, the aerodynamic properties of the airframe, such as the aerodynamic drag, may be altered to increase fuel efficiency.

The present invention focuses on the third of the three parameters identified above. Specifically, the present invention provides for an aircraft with an improved aerodynamic profile that results in a more efficient aircraft, among other benefits. More specifically, the present invention provides for a morphing wing that permits in-flight adjustment of the shape of the wing to optimize performance of the wing under variable conditions.

Typically, aircraft experience three different modes of operation when in flight. The first mode of operation concerns flight characteristics associated with the aircraft during take-off and ascent. The second mode of operation concerns flight characteristics associated with the aircraft when flying at a cruising altitude. The third mode of operation concerns flight characteristics when the aircraft is in a descent, approaching an airport for landing.

Each of these three modes of operation subjects the aircraft to different dynamic, flight conditions. For an aircraft to perform optimally in each of these three modes, the aircraft must alter its flight characteristics. In most modern aircraft, this includes altering the displacement and/or angle of one or more of the aerodynamic surfaces on the wing, such as the flaps. Flaps also are referred to as "high-lift" surfaces or "control" surfaces, depending upon the specific operation of the aerodynamic surface. As should be apparent to those skilled in the art, high-lift surfaces enhance lift generated by the wing. As also should be apparent to those skilled in the art, control surfaces typically refer to those surfaces that steer the aircraft. It is noted that these terms may be used interchangeably. Depending upon the design and orientation of the aircraft, it is possible that a high-lift surface may provide control or that a control surface may provide lift.

While changing the configuration of the high-lift surfaces (e.g., flaps and slats) on an aircraft's wing is a suitable solution to altering the aerodynamic properties of the aircraft during flight, these types of alterations do not take full advantage of the aerodynamic principles that are associated with aircraft wings. More specifically, these types of adjustment do not take advantage of the ways in which the wings of an aircraft may be changed during flight to alter the flight characteristics of the aircraft (e.g., combination of longitudinal and lateral shape changes).

As a preliminary matter, with reference to FIG. 1, there are four primary ways in which the wing of an aircraft may be altered. The four ways are referred to herein as wing morphologies. The four wing morphologies for an aircraft 10, which indicate a wing shape change from an initial state 12, are: (1) a span morphology 14, (2) a twist morphology 16, (3) a sweep morphology 18, and (4) a dihedral morphology 20.

A span morphology 14 refers to a change in the overall wing span 22 of the aircraft 10. As should be apparent to those skilled in the art, the wing span 22 typically refers to the dimension that is measured from the tip of one wing 24 to the tip of the opposing wing 26. In multi-wing aircraft, the wing span 22 is the largest span dimension of the aircraft 10. For purposes of describing the present invention, the term wing span (or span) also is used to describe the length of an individual wing 24, 26 from its root 28 to its tip 30.

With reference to the span morphology 14, a wing 24, 26 that is able to alter its span 22 has the capability of enlarging or shrinking along the span 22 of the wing 24, 26. The arrows 32 indicate this motion.

With reference to the twist morphology 16, a wing 24, 26 that is able to alter its shape along the length of the span 22 will move in accordance with the arrows 34. As should be apparent, a twisting motion is a rotational motion around an axis 36 that extends along the span 22 of the wing 24, 26.

With reference to the sweep morphology 18, a wing 24, 26 that is able to alter its shape along the span 22 will move in accordance with the arrows 38. In other words, the wings 24, 26 are able to move forwardly or rearwardly in relation to the axis 36.

With reference to the dihedral morphology 20, a wing 24, 26 that is able to alter its shape along the span 22 will move in accordance with the arrow 40. In other words the wings move upwardly or downwardly with reference to a starting position. This is akin to a flapping motion for the wings 24, 26.

Figure 2:
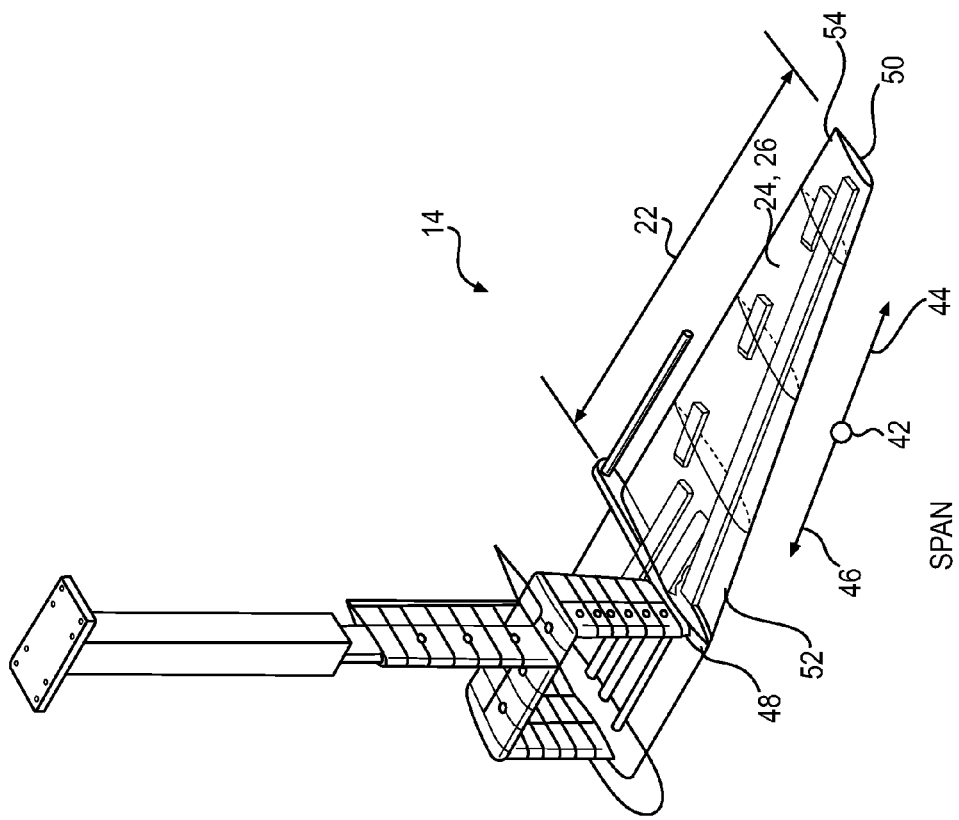
FIG. 2 is a perspective, graphical illustration of an engineering mock-up of a wing for an aircraft, illustrating span motion of the wing.

FIG. 2 is a graphical depiction of an engineering mock-up of a wing 26 with a span 22, as defined above. In this illustration, a point 42 is defined in relation to the wing 26. If the span 22 is changed according to the span morphology 14, the point 42 will move outwardly from the body of the aircraft 10 as shown by arrow 44 or inwardly toward the body of the aircraft 10 as shown by arrow 46.

For reference, the wing 26 has a root 48, a tip 50, a leading edge 52, and a trailing edge 54. The wing 26 also includes an upper surface and a lower surface that provide lift (among other properties) for the aircraft 10.

Figure 3:
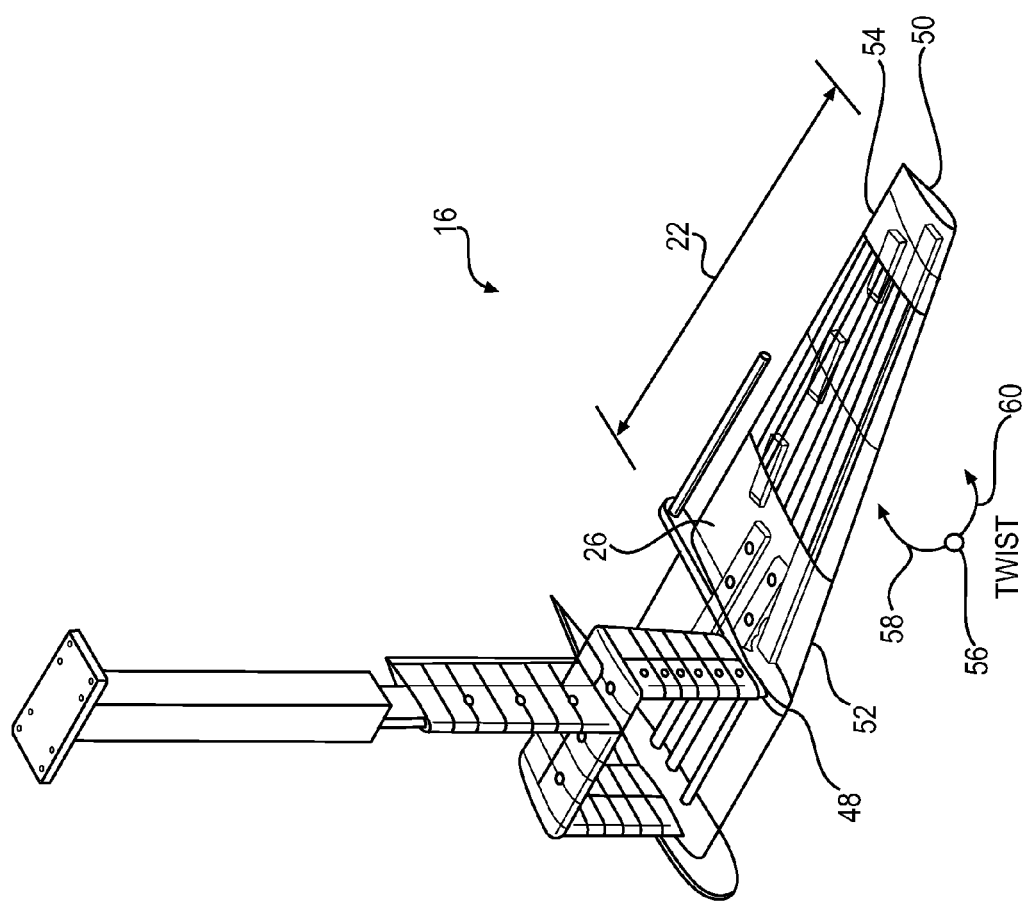
FIG. 3 is a perspective, graphical illustration of an engineering mock-up of a wing for an aircraft, illustrating twist motion of the wing.

FIG. 3 is a graphical depiction of an engineering mockup of a wing 26 with a span 22. In this illustration, a point 56 is defined in relation to the wing 26. If the wing 26 is changed in its shape according to the twist morphology 16, the point 56 will move upwardly along the upper arrow 58 or downwardly along the lower arrow 60 depending upon the direction of the twisting motion.

Figure 4:
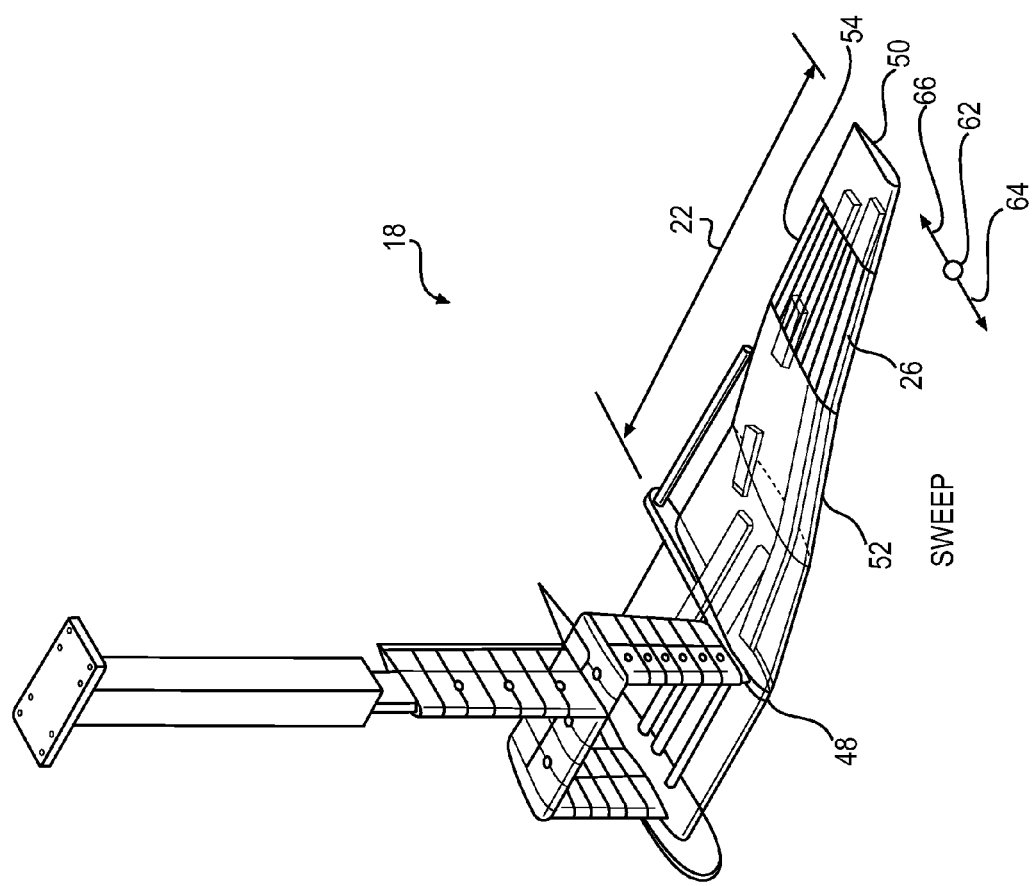
FIG. 4 is a perspective, graphical illustration of an engineering mock-up of a wing for an aircraft, illustrating sweep motion of the wing.

FIG. 4 is a graphical depiction of an engineering mockup of a wing 26 with a span 22. In this illustration, a point 62 is defined in relation to the wing 26. If the wing 26 is changed in its shape according to a sweep morphology 18, the point 62 will move forwardly along arrow 64 or rearwardly along arrow 66.

Figure 5:
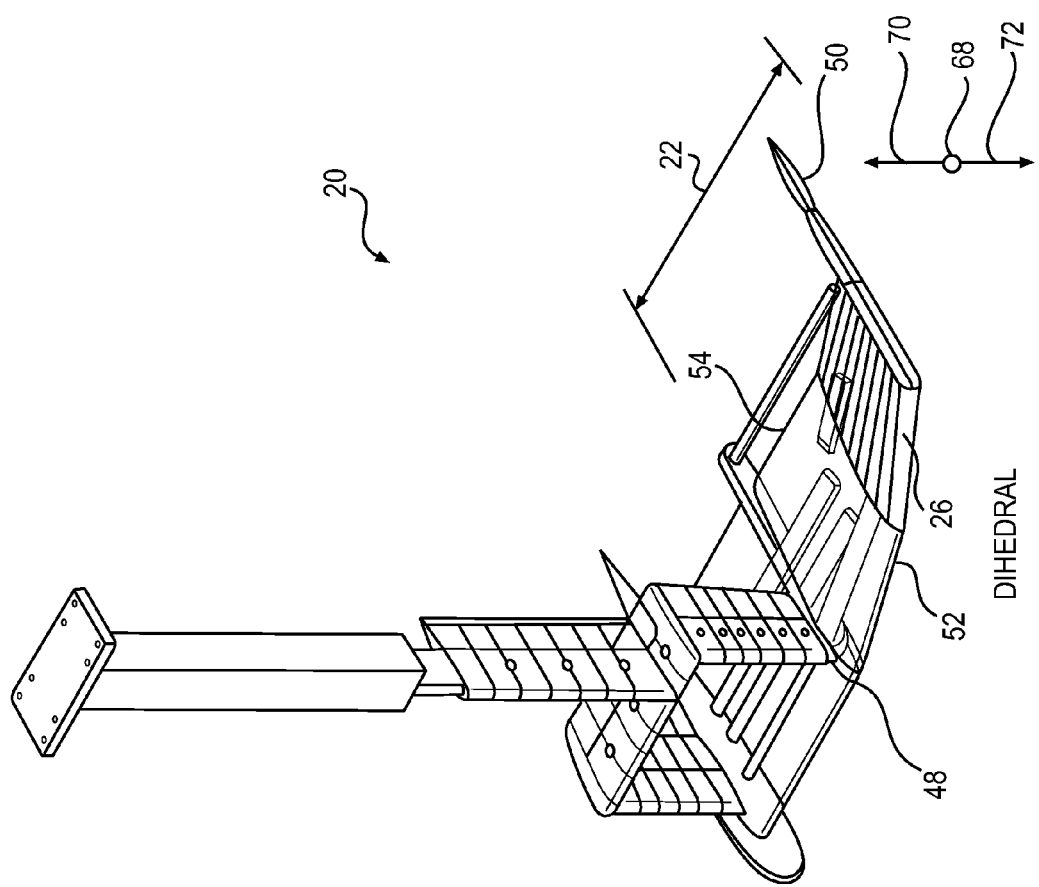
FIG. 5 is a perspective, graphical illustration of an engineering mock-up of a wing for an aircraft, illustrating dihedral motion of the wing.

FIG. 5 is a graphical depiction of an engineering mockup of a wing 26 with a span 22. In this illustration, a point 68 is defined in relation to the wing 26. If the wing 26 is changed in its shape according to a dihedral morphology 20, the point 68 will move upwardly arrow 70 or downwardly along arrow 72. As noted above, this motion is akin to a flapping motion.

With reference to FIGS. 2-5, it is understood that the points 42, 56, 62, 68 will not follow the exact trajectories identified. For an actual wing, it is understood that the points 42, 56, 62, 68 will also move in other directions depending upon the morphology employed. However, FIGS. 2-5 are provided to illustrate the basic concepts underlying the four morphologies 14, 16, 18, 20 described herein.

Figure 6:
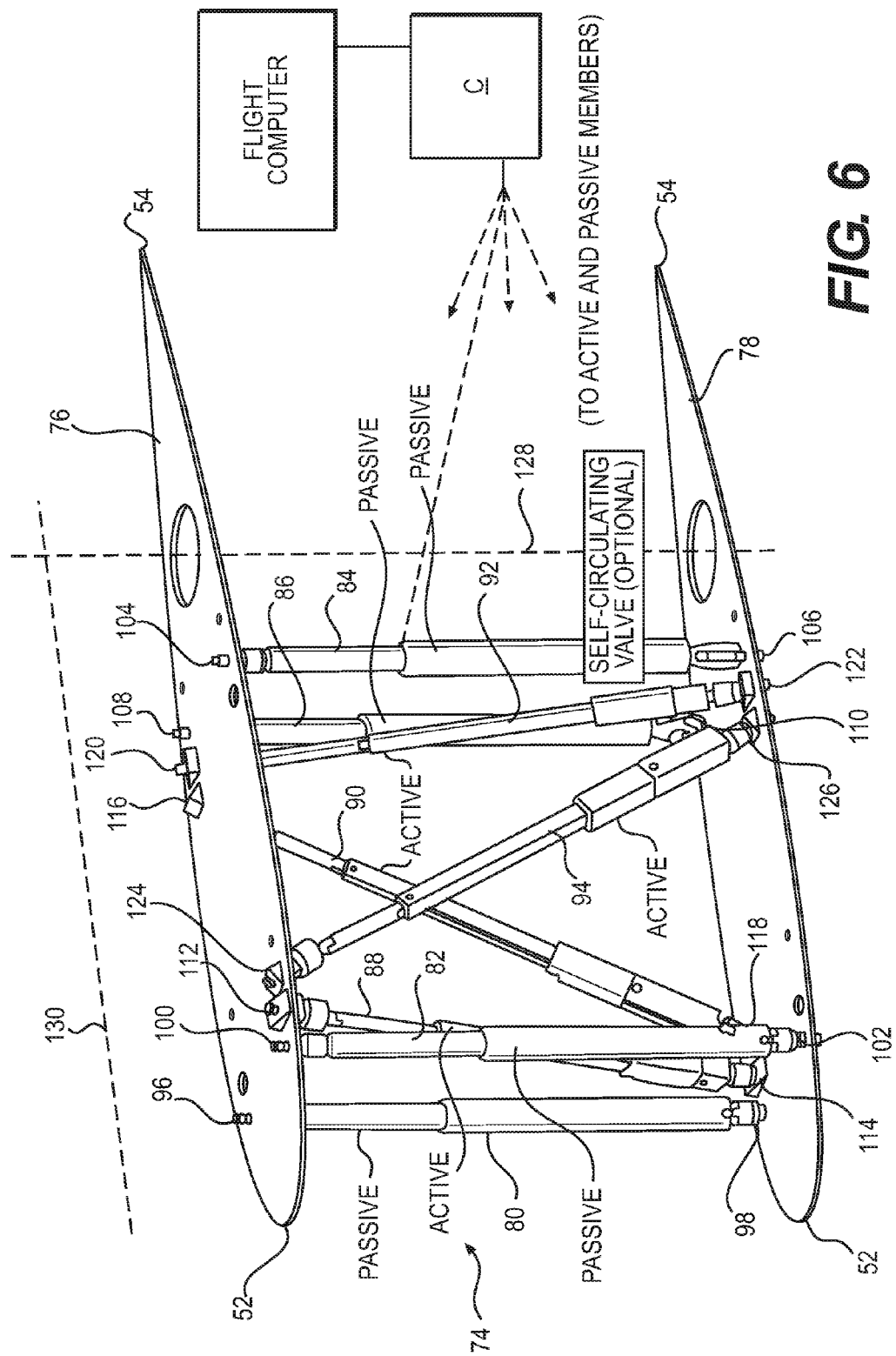

FIG. 6 illustrates one embodiment of a module 74 according to the present invention. The module 74 is understood to be incorporated into a wing 26 of an aircraft 10 so that the wing 26 may change its shape according to one or more of the identified morphologies 14, 16, 18, 20.

The module 74 includes a first rib 76 and a second rib 78. (It is noted that the terms "spar," "plate," or "structural plate" may be substituted for the term "rib," because the terms are considered to be interchangeable in the context of the present invention.) As should be recognized by those skilled in the art, an aircraft wing 26 will include a plurality of ribs 76, 78 vertically arranged, at predetermined structural positions, within the wing 26. The ribs 76, 78 are understood to be vertically oriented with respect to the wing and to extend from the leading edge 52 to the trailing edge 54 of the wing 26. The ribs 76, 78 are structural members that form part of the interior structure of the wing 26.

As should be apparent to those skilled in the art, the ribs 76, 78 are understood to be made from aluminum or an alloy thereof. While this is the likely material for the ribs 76, 78, the ribs 76, 78 may be made from any suitable material. For example, the ribs 76, 78 may be made from iron, steel, or an alloy or iron or steel. Alternatively, the ribs 76, 78 may be made from a material that includes a lightweight metal such as magnesium and its associated alloys.

In still further contemplated embodiments, the ribs 76, 78 may be made from a non-metallic material, such as a composite material. A composite may include a material made from a resin-impregnated fiber, such as carbon fiber, or the like. The precise material used for the ribs 76, 78 is not critical to operation of the module 74 of the present invention. Accordingly, any suitable material may be employed without departing from the scope of the present invention.

The module 74 that is illustrated in FIG. 6 includes a total of eight members. Four of the members are passive members 80, 82, 84, 86. Four of the members are active members 88, 90, 92, 94. All eight members connect between the ribs 76, 78. While eight members are illustrated, the present invention should not be considered as being limited to any specific number of active or passive members. The present invention may encompass any numerical combinations of active and passive members.

The passive member 80 extends between a position 96 on the rib 76 to a position 98 on the rib 78. The passive member 82 extends between a position 100 on the rib 76 to a position 102 on the rib 78. The passive member 84 extends between a position 104 on the rib 76 to a position 106 on the rib 78. The passive member 86 extends between a position 108 on the rib 76 to a position 110 on the rib 78.

Similarly, the active member 88 extends between a position 112 on the rib 76 to a position 114 on the rib 78. The active member 90 extends between a position 116 on the rib 76 to a position 118 on the rib 78. The active member 92 extends between a position 120 on the rib 76 to a position 122 on the rib 78. The active member 94 extends between a position 124 on the rib 76 to a position 126 on the rib 78.

In the context of the present invention, an active member 88, 90, 92, 94 is contemplated to be a member that is capable of exerting a force between the ribs 76, 78 in a direction along a longitudinal axis of the active member 88, 90, 92, 94. Specifically, it is contemplated that the active members 88, 90, 92, 94 will be telescoping members that may either expand or contract depending upon the input signals provided thereto.

The active members 88, 90, 92, 94 may be hydraulically activated, pneumatically activated, electromechanically activated, activated by SMAs, and/or the like. The exact mechanism for the activation of the activation members 88, 90, 92, 94 is not critical to the operation of the module 74 of the present invention. Any other mechanism may be employed without departing from the scope of the present invention.

The passive members 80, 82, 84, 86 are contemplated to be responsive to the motions generated by the active members 88, 90, 92, 94, which motions are transmitted to the passive members 80, 82, 84, 86 via the ribs 76, 78. It is not contemplated that the passive members 80, 82, 84, 86 will exert any force actively on the ribs 76, 78. To the contrary, the passive members 80, 82, 84, 86 are contemplated to respond to changes in the orientation of the ribs 76, 78 as a result of the activation of the active members 88, 90, 92, 94.

As should be apparent from the depiction of the module 74 in FIG. 6, the active members 88, 90, 92, 94 are disposed such that they are oriented at an angle with respect to a lateral axis 128 defined by the span 22 of the wing and/or at an angle with respect to a longitudinal axis 130 defined between the leading edge 52 and the trailing edge 54 of the wing 26. The angle is contemplated to fall within a range of 0±90° to the lateral axis. It is noted that the lateral axis 128 is parallel to the lateral axis of the aircraft 10. The longitudinal axis 130 is parallel to the longitudinal axis of the aircraft 10. While this convention is adopted for purposes of describing the present invention, the lateral axis 128 and the longitudinal axis 130 need not be oriented in any specific manner with respect to the aircraft 10 to practice the present invention. For that matter the orientations of the active members 88, 90, 92, 94 are not critical to the present invention.

The passive members 80, 82, 84, 86 are disposed such that they are essentially parallel to the lateral axis 128 (e.g., at an angle of 0° with respect to the lateral axis). The passive members 80, 82, 84, 86 are also essentially parallel to one another. It is noted that, while the passive members 80, 82, 84, 86 are shown as being parallel to the lateral axis 128, this arrangement is not required for operation of the present invention. It is contemplated that the passive members 80, 82, 84, 86 may be angled with respect to one or both of the lateral axis 128 and/or the longitudinal axis 130 without departing from the scope of the present invention.

In the module 74, the active members 88, 90, 92, 94 and the passive members 80, 82, 84, 86 are connected between the ribs 76, 78 such that the attachment points are grouped in a specific manner. As illustrated, the connection points establish the corners of a rectangle on each of the ribs 76, 78. While this arrangement is consistent with the illustrated embodiment, other arrangements may be employed without departing from the scope of the present invention. For example, the connection points may establish the corners of a trapezoid, parallelogram, or other polygon, as appropriate for the module 74 employed.

With reference to the module 74 illustrated in FIG. 6, the passive members 80, 84 define two of the corners of the rectangle defined by the connection points 96, 104 on the rib 76. The other two corners of the rectangle on the rib 76 are occupied by three connection points, one each for the associated active members and one each for the associated passive members.

As should be apparent, each of the corners of the rectangle defined by the connection points on the rib 76 is effectively identified by the connection points 96, 100, 104, 108 between the passive members 80, 82, 84, 86 and the rib 76. Similarly, each of the corners of the rectangle defined by the connection points on the rib 78 is effectively identified by the connection points 98, 102, 106, 110 between the passive members 80, 82, 84, 86 and the rib 78.

As illustrated, the active members 88, 90, 92, 94 are oriented such that the active members 88, 90, 92, 94 connect adjacent to one another at opposing corners of the rectangle defined on the rib 76. The same is true for the rib 78, except that the corners are the opposite of those identified on the rib 76. As noted above, this particular arrangement of components reflects the contemplated embodiment of the module 74 that is illustrated in FIG. 6. The present invention contemplates that the active members 88, 90, 92, 94 and the passive members 80, 82, 84, 86 may be positioned in a different arrangement without departing from the scope of the present invention.

As should be apparent from the module 74 that is illustrated in FIG. 6, the cross-wise connection between the active members 88, 90, 92, 94 and the ribs 76, 78 permit the active members 88, 90, 92, 94 to tilt the ribs 76, 78 in any direction with respect to one another. Moreover, the active members 88, 90, 92, 94 do not interfere with one another mechanically when their respective orientations are altered by operation of the present invention.

The active members 88, 90, 92, 94 in the embodiment illustrated in FIG. 6 are contemplated to be linear actuators, the operation of which is controlled using magnetic and/or electromagnetic forces. As indicated above, however, any other type of control may be employed without departing from the scope of the present invention. For example, control may be hydraulic, pneumatic, and/or via SMAs.

The passive members 80, 82, 84, 86 are contemplated to be linear bearings or some other suitable telescoping member. The passive members are contemplated to be stiffening devices. Specifically, the passive members are contemplated to remain in a fixed, static orientation after being adjusted in cooperation with the active members 88, 90, 92, 94.

With continued reference to FIG. 6, the operation of the module 74 will now be described.

The active members 88, 90, 92 94 are contemplated to be linear actuators that are electromechanically actuated. In other words, application of an electrical, magnetic, or electromagnetic signal to the active members 88, 90, 92, 94 is contemplated to instruct the active members 88, 90, 92, 94 to change a length thereof. Specifically, the active members 88, 90, 92, 94 receive signals, as input, that instruct the active members 88, 90, 92, 94 to extend or retract to a required length. This motion, in turn, will cause the ribs 76, 78 to change in their respective orientations.

As illustrated in FIG. 6, the active members 88, 90, 92, 94 are positioned diagonally with respect to the lateral axis 128 and the longitudinal axis 130. The active members 88, 90, 92, 94 apply appropriate forces to alter the angular positions of the ribs 76, 78 with respect to one another.

The passive members 80, 82, 84, 86, on the other hand are not activated such that they actively apply any forces to the ribs 76, 78. Instead the passive members 80, 82, 84, 86 merely extend or contract along with the movement of the ribs 76, 78 upon which the active members 88, 90, 92, 94 operate. Alternatively, the passive members 80, 82, 84, 86 may remain in a static position depending upon the positional relationship between the ribs 76, 78.

With this arrangement of active and passive members, it is possible to change the orientation of the ribs 76, 78 with respect to one another. When the module is installed in a wing 26, it is then possible to alter the shape of the wing 26 according to one or more of the shape morphologies 14, 16, 28, 20 discussed above, because the wing 26 incorporates the module 74, which changes the shape of the wing 26 according to inputs provided to the active members 88, 90, 92, 94.

So that the module retains a rigid shape in the event that the active members 88, 90, 92, 94 lose the ability to receive signals, it is contemplated that at least the passive members 80, 82, 84, 86 will incorporate a mechanism by which the passive members 80, 82, 84, 85 are locked in a rigid state.

In one contemplated embodiment, the passive members 80, 82, 84, 86 may include self-circulating valves. According to this embodiment, the passive members 80, 82, 84, 86 may be hydraulic pistons having two interior chambers that are fluidically connected to one another via a self-circulating valve. When the self-circulating valve is open, fluid is permitted to flow freely between the two chambers within the passive members 80, 82, 84, 86. As a result, when the self-circulating valve is opened, the passive members 80, 82, 84, 86 are pliant and will experience changes in length depending upon associated changes in the configuration of the ribs 76, 78 to which they are attached.

When the self-circulating valve is closed, however, the fluid in the two chambers within the passive members 80, 82, 84, 86 cannot circulate. As a result, when the self-circulating valve is closed, the passive members 80, 82, 84, 86 become rigidly fixed. In other words, when the self-circulating valve is closed, the lengths of the passive members 80, 82, 84, 86 cannot be changed. In this manner, by closing the self-circulating valve, the passive members 80, 82, 84, 86 transform into rigid, structural members within the wing 26. As such, the passive members 80, 82, 84, 86 are lockable in a particular position to fix the wing 26 in a predetermined orientation. The passive members 80, 82, 84, 86 may be locked by any means, including but not limited to self-circulating valves or mechanical brakes.

It is noted that one embodiment of the present invention also contemplates that the active members 88, 90, 92, 94 may include self-circulating valves so that the active members 88, 90, 92, 94 may be locked into specific orientations in the same manner as the passive members 80, 82, 84, 86.

The lockability of the passive members 90, 82, 84, 86 (and, alternatively, also the active members 88, 90, 92, 94) is required for operation of the module 74 of the present invention. Since the module 74 will be incorporated into the wing 26, it is important to make sure that the wing 26 will retain a rigid configuration during operation. This is especially important if all power is lost to the active members 88,

90, 92, 94 and the passive members 80, 82, 84, 86. In the instance where power is lost, the lockability of the passive members 80, 82, 84, 86 (and also some or all of the active members 88, 90, 92, 94) will maintain the wing 26 in a rigid orientation.

Without limiting the present invention, it is noted that the active members 88, 90, 92, 94 alternatively may be electromechanically operated, hydraulically operated, pneumatically operated, and/or operated via a shape memory alloy ("SMA"). Similarly, the active member 88, 90, 92, 94 may be locked electromechanically, hydraulically, pneumatically, and/or via a SMA. Similarly, it is contemplated that the passive members 80, 82, 84, 86 alternatively may be operated and locked electromechanically, hydraulically, pneumatically, and/or via a SMA.

With continued reference to FIG. 6, the connections between the active members 88, 90, 92, 94 and the passive members 80, 82, 84, 86 is now discussed. Specifically, as illustrated in FIG. 6, each of the active members 88, 90, 92, 94 and the passive members 80, 82, 84, 86 are connected between the ribs 76, 78 with suitable fasteners. For example, the fasteners may be screw and nut type fasteners. Alternatively, the active members 88, 90, 92, 94 and the passive members 80, 82, 84, 86 may be attached to the ribs 76, 78 via mechanical joints, such as bearings, ball joints, or other load-bearing mechanical structures. The mechanical joints are contemplated to be attached to structural members that are connected (such as by welds) to the ribs 76, 78. In another contemplated embodiment, the ribs 76, 78 may be machined or formed to include points of attachment to the active members 88, 90, 92, 94 and the passive members 80, 82, 84, 86 and/or any mechanical joints associated therewith. In this embodiment, therefore, the structural members that provide points of attachment are integral to the ribs 76, 78. As should be apparent, however, the type of fastener and the joint forming the connection is not critical to operation of the present invention and any suitable alternative fastener and/or joint may be employed without departing from the scope of the present invention.

Figure 7:
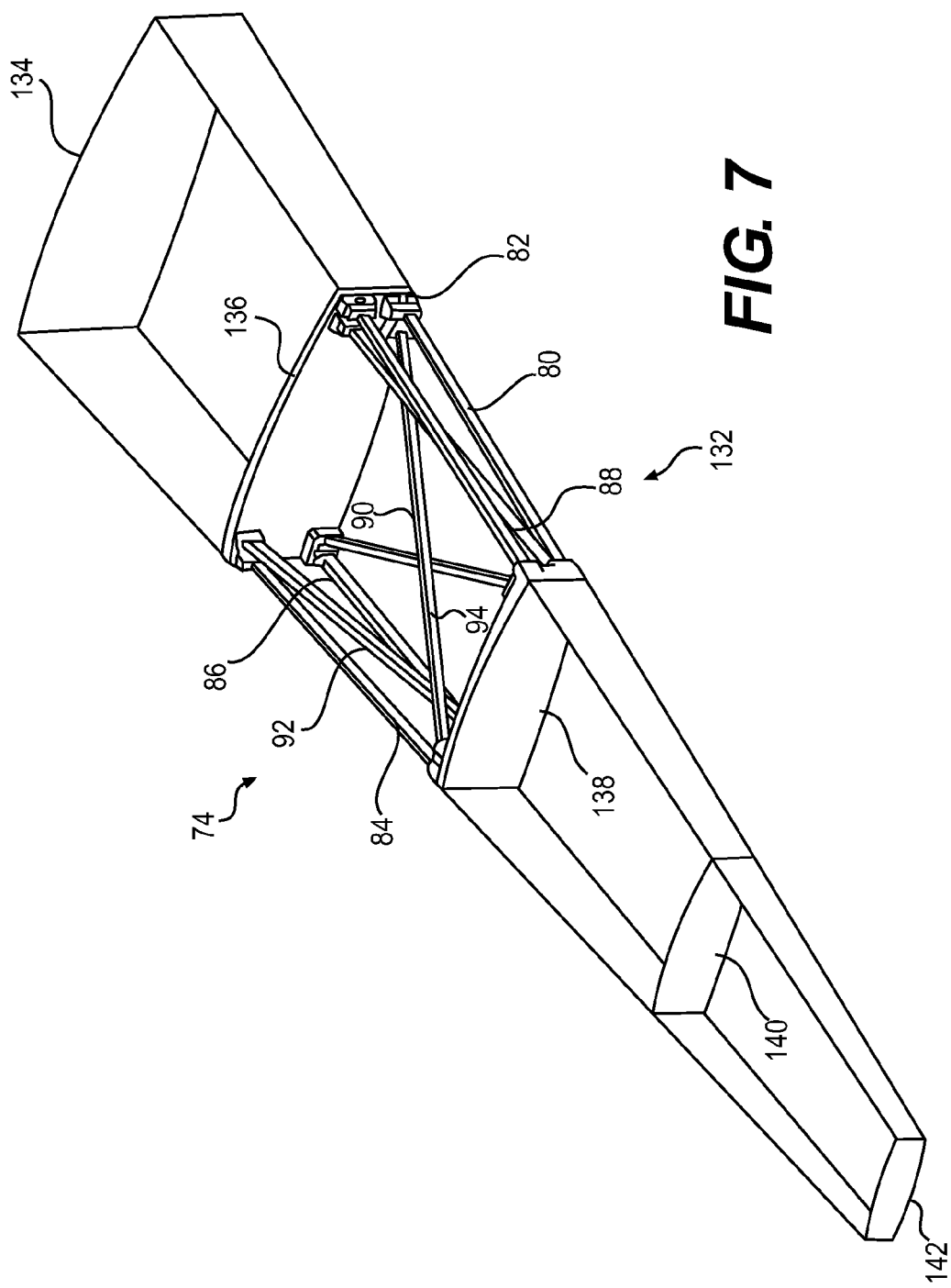
FIG. 7 is a perspective illustration of one module of the morphing wing of the present invention.

FIG. 7 is a perspective, graphical illustration of a wing 132 according to the present invention. The wing 132 includes five ribs 134, 136, 138, 140, 142 that are spaced along the interior of the wing 132. A module 74 according to the present invention is disposed between adjacent ribs 136 and 138. As noted above, when the active members 88, 90, 92, 94 are operated, the ribs 136, 138 will change in their respective orientations. This will result a change in the shape of the wing 132 according to one or more of the identified morphologies 14, 16, 18, 20.

Figure 8:
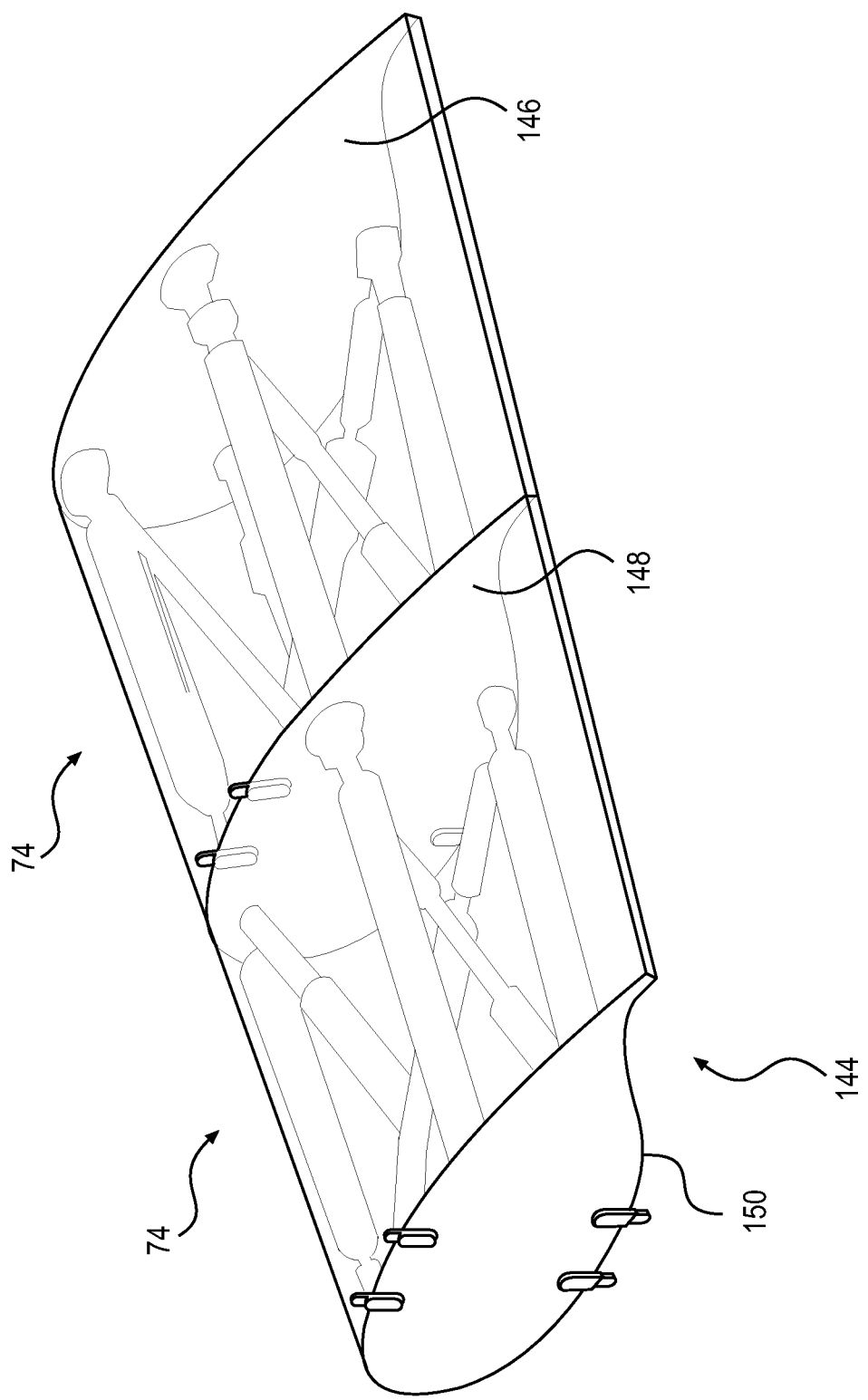
FIG. 8 is a perspective, graphical illustration of two adjacent modules of the morphing wing of the present invention.

FIG. 8 is a perspective illustration of two modules 74 spaced side-by-side in part of a wing 144. In this illustration, there are three ribs 146, 148, 150. The two modules 74 share the center rib 146. When modules 74 are connected in this manner it is possible to enhance the morphing condition of the wing 144. In this embodiment, each module 74 makes an incremental change to the shape of the wing 144. As such, a larger, overall shape change is possible from root to tip of the wing 144.

Figure 9:
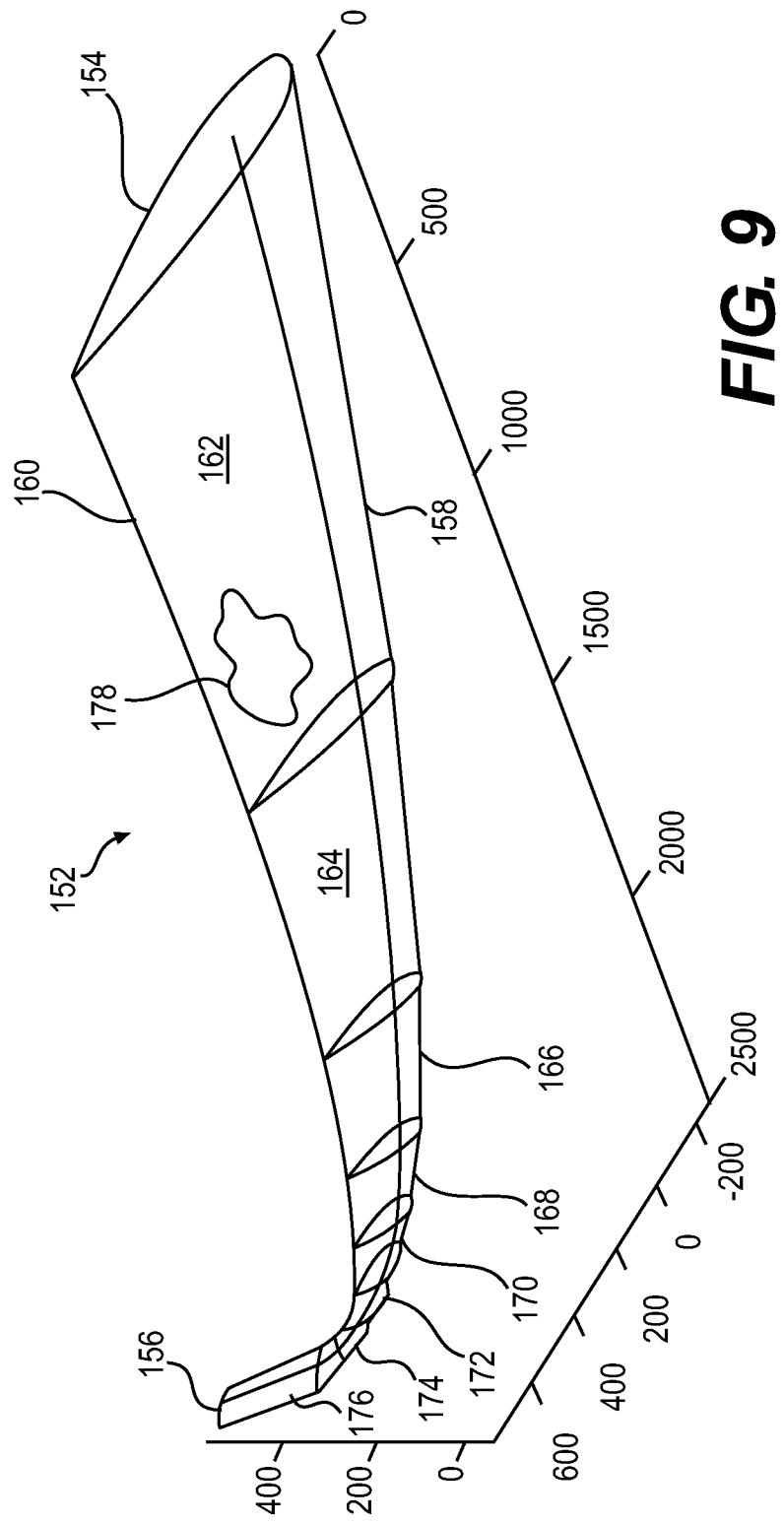
FIG. 9 is a graphical illustration of a morphing wing, in a dihedrally morphed condition, relying on a plurality of the modules of the present invention.

FIG. 9 is graphical illustration of a wing 152. The wing 152 defines a root 154, a tip 156, a leading edge 158 and a trailing edge 160. There are eight separate modules 162, 164, 166, 168, 170, 172, 174, 176 disposed between the root 154 and the tip 156 of the wing 152. Adjacent modules share a common rib with their neighboring modules.

With respect to FIG. 9, it is noted that each module 162, 164, 166, 168, 170, 172, 174, 176 may have a slightly different size and orientation in the wing 152. This is contemplated to be an aspect of the present invention.

With renewed reference to FIG. 2, the operation of one or modules 74 in span morphology 14 is contemplated to permit the wing 24, 26 to alter its span 22 within a range of 0-25% of its shortest length. In other words, it is contemplated that the span 22 may be increased by up to 25% of the original (shortest) span 22. In another contemplated embodiment, the change in wing span 22 is contemplated to fall within a range of 0-20%. Further, the range may be 0-15%. Still further the range may be 0-10%. Finally, it is contemplated that the change in the wing span 22 may fall within a range of 0-5%. In further contemplated embodiments, the lower limit for the ranges may be 5%, 10%, or 15% without departing from the scope of the present invention. As such, for example, one contemplated range for the change in wing span 22 that is made possible by employing one or more modules 74 is a range of 5-10%.

With reference to FIG. 3, which illustrates the twist morphology 16, the degree of the angle of twist is contemplated to fall within a range of ±45° from an initial position for the wing 24, 26. In other contemplated embodiments of the present invention, the range is ±40°, ±35°, ±30°, ±25°, ±20°, ±15°, ±10°, and/or ±5°. Any other permutation of these ranges is also considered to fall within the scope of the present invention. For example, the wing 24, 26 may be permitted to twist within a range of −10° to +25°. With reference to FIG. 4, which illustrates the sweep morphology 18, operation of one or more modules 74 is contemplated to alter the location of the tips 50 of the wings 24, 26 (i.e., the "sweep") within a range of ±45° from the initial position. In other words, it is contemplated that tips 50 of the wings 24, 26 may move forwardly (a positive angle) or rearwardly (a negative angle) within a range of ±45°. In other contemplated embodiments of the present invention, the range is ±40°, ±35°, ±30°, ±25°, ±20°, ±15°, ±10°, and/or ±5°. Any other permutation of these ranges is also considered to fall within the scope of the present invention. For example, the tip 50 of the wing 24, 26 may be permitted to sweep within a range of +10° to −15°.

With reference to FIG. 5, which illustrates the dihedral morphology 20, the degree of the angle of deviation from an initial position is contemplated to fall within a range of ±45° for the wing 24, 26. A positive change refers to movement of the wing upwardly from the initial position. A negative change refers to movement of the wing downwardly from the initial position. In other contemplated embodiments of the present invention, the range is ±40°, ±35°, ±30°, ±25°, ±20°, ±15°, ±10°, and/or ±5°. Any other permutation of these ranges is also considered to fall within the scope of the present invention. For example, the wing 24, 26 may be permitted to engage in a dihedral variation within a range of +10° to −20°.

With continued reference to FIG. 6, a controller C is illustrated. The controller C is contemplated to be connected electrically to the active members 88, 90, 92, 94 and the passive members 80, 82, 84, 86 in a manner that provides independent control over each of the members. The controller C is understood to receive commands from a flight computer on board the aircraft 10. The flight computer is understood to analyze the flight conditions for the aircraft 18 and compute an optimal configuration for the wings 24, 26 in any of the four morphologies 14, 16, 18, 20 discussed above.

The flight computer will then provide the parameters for a particular wing configuration to the controller C. The controller C will then calculate a configuration for the active members 88, 90, 92, 94 and the passive members 80, 82, 84, 86 that satisfies the output conditions provided from the flight computer.

It is noted that a separate controller C is not required to practice the present invention. The controller C may be incorporated into the flight computer or any other processor that is available on the aircraft 10.

As should be apparent, the wing 26 of the present invention also will require an external skin 178 disposed thereon, as indicated in FIG. 9. Since the wing 26 morphs, the skin 178 is contemplated to be made from a material that permits the different morphologies 14, 16, 18, 20.

In one contemplated embodiment, the skin may be flexible. It is contemplated that the skin may be made from a metallic material, a composite material, and/or a SMA.

In another contemplated embodiment, the skin may be made of a number of rigid scales (akin to fish scales) that are provided in an overlapping manner. The scales are understood to move in relation to one another while maintaining a continuous outer surface for the wing 26 so that the wing 26 provides sufficient lift.

In a further embodiment, the skin 178 may be made from a number of slats that are arranged, like louvers in a venetian blind, so that they overlap one another and move with respect to one another.

As should be apparent, the exact composition of the skin is not critical to operation of the present invention.

It is also noted that, without limitation of the present invention, the skin may be active or passive in different contemplated embodiments of the present invention. A skin made from a metallic alloy, for example, with no large displacement dependency on temperature activation or electrical activation qualifies as an active skin. A skin made from a SMA, capable of changing its shape via temperature activation or electrical activation qualifies as a passive skin.

In one further contemplated embodiment, the wing 26 of the present invention may be morphed using a routed actuation system that incorporates, for example, cables, struts, and pulleys. This differs from the embedded actuation that is described above.

As noted above, the present invention is described in connection with one or more embodiments thereof. The embodiments are intended to be illustrative of the breadth of the present invention. Focus on any one particular embodiment is not intended to be limiting thereof. The present invention, therefore, is intended to encompass variations and equivalents, as would be appreciated by those skilled in the art.

What is claimed is:

1. A morphing wing for an aircraft, comprising:
a top surface, a bottom surface, a leading edge, a trailing edge, a tip, and a root, wherein the root is adapted for connection to the aircraft;
a plurality of structural ribs disposed between the root and tip, wherein the structural ribs extend between the top surface and the bottom surface;
four active members connected between adjacent first and second structural ribs of the plurality of structural ribs, the four active members being actively adjustable, wherein:
a first active member and a second active member attach to the first structural rib proximate each other at a first position;
a third active member and a fourth active member attach to the first structural rib proximate each other at a second position;
the first active member and the third active member attach to the second structural rib proximate each other at a third position;
the second active member and the fourth active member attach to the second structural rib proximate each other at a fourth position; and
four passive members connected between the adjacent first and second structural ribs, the four passive members being passively adjustable, wherein:
a first passive member is connected between the third position on the second structural rib and a fifth position on the first structural rib;
a second passive member is connected between the second position on the first structural rib and a seventh position on the second structural rib;
a third passive member is connected between the fourth position on the second structural rib and a sixth position on the first structural rib; and
a fourth passive member is connected between the first position on the first structural rib and an eighth position on the second structural rib;
wherein adjustment of at least one of the four active members moves the adjacent first and second structural ribs with respect to one another, thereby morphing the wing from a first configuration to a second configuration,
wherein the four active members attach to the first structural rib such that the first position and the second position are at corners of a first quadrilateral diagonally opposite to one another, and
wherein the four passive members attach to the first structural rib in proximity to the corners of the first quadrilateral and to the second structural rib in proximity to corners of a second quadrilateral.

2. The morphing wing of claim 1, wherein the root is connected to the aircraft, and wherein the adjustment of at least one of the four active members moves each of the adjacent first and second structural ribs in relation to a body of the aircraft.

3. The morphing wing of claim 1, wherein morphing of the wing from the first configuration to the second configuration comprises at least one selected from a group comprising: a dihedral alteration of the wing, a sweep alteration of the wing, a twist alteration of the wing, and a span alteration of the wing.

4. The morphing wing of claim 1, wherein the four active members are lockable in a rigid state.

5. The morphing wing of claim 1, wherein at least one of the four active members comprises a linear actuator.

6. The morphing wing of claim 5, wherein the linear actuator comprises at least one of an electromechanically operated actuator, a hydraulically operated actuator, or a pneumatically operated actuator.

7. The morphing wing of claim 1, wherein the four passive members are lockable in a rigid state.

8. The morphing wing of claim 1, wherein at least one of the four passive members is a linear bearing.

9. The morphing wing of claim 8, wherein the linear bearing comprises a self-circulating valve.

10. The morphing wing of claim 1, further comprising:
a skin covering the morphing wing.

11. The morphing wing of claim 1, wherein:
at least one of the four active members lies between 0 and ±90° in relation to a plane of the first structural rib.

12. The morphing wing of claim 1, wherein the four passive members are attached between the adjacent first and second structural ribs substantially perpendicular to a plane of the first structural rib.

13. The morphing wing of claim 1, wherein the first quadrilateral is a first rectangle and the second quadrilateral is a second rectangle.

14. The morphing wing of claim 13, wherein the third position and fourth position are at corners of the second rectangle diagonally opposite to one another.

15. A morphing wing for an aircraft, comprising:
a top surface, a bottom surface, a leading edge, a trailing edge, a tip, and a root, wherein the root is adapted for connection to the aircraft;
a first set of two adjacent structural ribs and a second set of two adjacent structural ribs, wherein the first set of two adjacent structural ribs and the second set of two adjacent structural ribs share a common structural rib, wherein each of the first set and second set of two adjacent structural ribs comprises:
four active members connected between adjacent first and second structural ribs, the four active members being actively adjustable, wherein:
a first active member and a second active member attach to the first structural rib proximate each other at a first position;
a third active member and a fourth active member attach to the first structural rib proximate each other at a second position;
the first active member and the third active member attach to the second structural rib proximate each other at a third position;
the second active member and the fourth active member attach to the second structural rib proximate each other at a fourth position; and
four passive members connected between the adjacent first and second structural ribs, the four passive members being passively adjustable, wherein:
a first passive member is connected between the third position on the second structural rib and a fifth position on the first structural rib;
a second passive member is connected between the second position on the first structural rib and a seventh position on the second structural rib;
a third passive member is connected between the fourth position on the second structural rib and a sixth position on the first structural rib; and
a fourth passive member is connected between the first position on the first structural rib and an eighth position on the second structural rib;
wherein adjustment of at least one of the four active members moves the respective adjacent first and second structural ribs with respect to one another, thereby morphing the wing from a first configuration to a second configuration,
wherein the four active members attach to the first structural rib such that the first position and the second position are at corners of a first quadrilateral diagonally opposite to one another, and
wherein the four passive members attach to the respective first structural rib in proximity to the corners of the first quadrilateral and to the respective second structural rib in proximity to corners of a second quadrilateral.

16. The morphing wing of claim 15, wherein the root is connected to the aircraft, and wherein the adjustment of at least one of the four active member members moves each of the respective adjacent first and second structural ribs in relation to a body of the aircraft.

17. The morphing wing of claim 15, wherein the four active members are lockable in a rigid state.

18. The morphing wing of claim 15, wherein the the four passive members are lockable in a rigid state.

19. The morphing wing of claim 15, wherein:
the four active members are disposed at between 0 and ±90° in relation to a plane of one of the respective adjacent first and second structural ribs.

20. A module for a morphing wing for an aircraft, comprising:
adjacent first and second structural ribs;
four active members connected between the adjacent first and second structural ribs, the four active members being actively adjustable, wherein:
a first active member and a second active member attach to the first structural rib proximate each other at a first position;
a third active member and a fourth active member attach to the first structural rib proximate each other at a second position;
the first active member and the third active member attach to the second structural rib proximate each other at a third position;
the second active member and the fourth active member attach to the second structural rib proximate each other at a fourth position; and
four passive members connected between the adjacent first and second structural ribs, the four passive members being passively adjustable, wherein:
a first passive member is connected between the third position on the second structural rib and a fifth position on the first structural rib;
a second passive member is connected between the second position on the first structural rib and a seventh position on the second structural rib;
a third passive member is connected between the fourth position on the second structural rib and a sixth position on the first structural rib; and
a fourth passive member is connected between the first position on the first structural rib and an eighth position on the second structural rib;
wherein adjustment of at least one of the four active member moves the adjacent first and second structural ribs with respect to each another for causing the morphing wing to move from a first configuration to a second configuration,
wherein the four active members attach to the first structural rib such that the first position and the second position are at corners of a first quadrilateral diagonally opposite to one another, and
wherein the four passive members attach to the first structural rib in proximity to the corners of the first quadrilateral and to the second structural rib in proximity to corners of a second quadrilateral.

21. The morphing wing of claim 20, wherein when the first structural rib and the second structural rib are substantially parallel to each other and the first, second, third and fourth passive members are substantially perpendicular to a plane of the first structural rib.

* * * * *